US012744431B2

(12) United States Patent
Krank et al.

(10) Patent No.: US 12,744,431 B2
(45) Date of Patent: Sep. 22, 2026

(54) CIRCULATION SUMP DEVICE FOR AN ELECTRIC DRIVE UNIT OF A VEHICLE

(71) Applicant: Bayerische Motoren Werke Aktiengesellschaft, Munich (DE)

(72) Inventors: Benjamin Krank, Munich (DE); Ferdinand Weidinger, Munich (DE); Bernhard Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 290 days.

(21) Appl. No.: 18/700,034

(22) PCT Filed: Nov. 23, 2022

(86) PCT No.: PCT/EP2022/082895

§ 371 (c)(1), (2) Date: Apr. 10, 2024

(87) PCT Pub. No.: WO2023/117268

PCT Pub. Date: Jun. 29, 2023

(65) Prior Publication Data

US 2024/0339895 A1 Oct. 10, 2024

(30) Foreign Application Priority Data

Dec. 20, 2021 (DE) .................... 10 2021 133 902.2

(51) Int. Cl.
*H02K 9/193* (2006.01)
*F16H 57/04* (2010.01)
(Continued)

(52) U.S. Cl.
CPC ......... *H02K 9/193* (2013.01); *F16H 57/0452* (2013.01); *F16H 57/0475* (2013.01);
(Continued)

(58) Field of Classification Search
CPC .... B60K 1/00; B60K 11/02; B60K 2001/001; B60K 2001/006; B60Y 2200/91;
(Continued)

(56) References Cited

U.S. PATENT DOCUMENTS

2014/0265658 A1 9/2014 Sten et al.
2019/0097482 A1* 3/2019 Huber .................... B60K 11/02
(Continued)

FOREIGN PATENT DOCUMENTS

AU 680092 B2 * 7/1997 ........... F16N 39/002
CN 111520452 A * 8/2020 ......... F16H 57/0435
(Continued)

OTHER PUBLICATIONS

Translation for CN111520452A (Year: 2020).*
(Continued)

*Primary Examiner* — Christopher M Koehler
*Assistant Examiner* — Ethan Nguyen Vo
(74) *Attorney, Agent, or Firm* — Crowell & Moring LLP

(57) ABSTRACT

A circulation sump device for an electric drive unit of a motor vehicle, which can be lubricated and/or temperature-controlled via a lubricant, comprising a lubricant sump with a first axial region and a second axial region, a lubricant reservoir which extends below the lubricant sump in the first axial region and is connected to the lubricant sump via a
(Continued)

lubricant drain opening, and a lubricant sump pump line which is designed to pump lubricant out of the second axial region of the lubricant sump into the lubricant reservoir.

20 Claims, 2 Drawing Sheets

(51) Int. Cl.
*F16N 7/40* (2006.01)
*F16N 31/00* (2006.01)
*H02K 7/116* (2006.01)

(52) U.S. Cl.
CPC ............... *F16N 7/40* (2013.01); *F16N 31/00* (2013.01); *H02K 7/116* (2013.01); *F16N 2210/18* (2013.01)

(58) Field of Classification Search
CPC . B60Y 2306/03; F16H 57/027; F16H 57/043; F16H 57/0441; F16H 57/0443; F16H 57/045; F16H 57/0452; F16H 57/0453; F16H 57/0475; F16H 57/0476; F16N 2210/18; F16N 31/00; F16N 7/40; H02K 7/116; H02K 9/193
See application file for complete search history.

(56) References Cited

U.S. PATENT DOCUMENTS

2019/0120369 A1 4/2019 Staake et al.
2020/0284337 A1* 9/2020 Gebhard ............. F16H 57/0441

FOREIGN PATENT DOCUMENTS

| | | | | | |
|---|---|---|---|---|---|
| CN | 113803444 | A | * | 12/2021 | ........... F16H 57/043 |
| DE | 10 2011 077 507 | A1 | | 12/2012 | |
| DE | 102014205881 | B3 | * | 6/2015 | ......... F16H 57/0447 |
| DE | 10201402050881 | B3 | | 6/2015 | |
| DE | 10 2016 211 226 | B3 | | 6/2017 | |
| DE | 10 2016 215 423 | A1 | | 2/2018 | |
| DE | 10 2019 126 914 | A1 | | 4/2021 | |
| FR | 3 061 374 | A1 | | 6/2018 | |
| FR | 3061374 | B1 | * | 5/2019 | ............... H02K 9/24 |
| JP | 6-94805 | B2 | | 11/1994 | |
| WO | WO 2015/016058 | A1 | | 2/2015 | |

OTHER PUBLICATIONS

Translation for CN113803444A (Year: 2021).*
Translation for AU 680092 (Year: 1995).*
Translation for DE102014205881 (Year: 2015).*
International Search Report (PCT/ISA/210) issued in PCT Application No. PCT/EP2022/082895 dated Feb. 16, 2023 with English translation (6 pages).
German-language Written Opinion (PCT/ISA/237) issued in PCT Application No. PCT/EP2022/082895 dated Feb. 16, 2023 with English translation (10 pages).
German-language Search Report issued in German Application No. 10 2021 133 902.2 dated Oct. 19, 2022 with partial English translation (12 pages).

* cited by examiner

CIRCULATION SUMP DEVICE FOR AN ELECTRIC DRIVE UNIT OF A VEHICLE

BACKGROUND AND SUMMARY

This disclosure relates to a circulation sump device for an electric drive unit of a motor vehicle, and to an electric drive unit.

In many vehicle concepts, electric drive machines are situated in the rear of the vehicle below the trunk—optionally, in a common housing assembly even for an output transmission. Nevertheless, it should be possible to accommodate an ideally large trunk volume and/or a third row of seats. At the same time, a closed underbody and a diffusor are required for reasons of efficiency in motor vehicles having an electric drive.

Therefore, circulation sump devices as are known from DE 10 2016 215 423 A1, for example, are not suitable, or suitable only to a limited extent, for motor vehicles with a comparatively high requirement in terms of the dimensional chain in the z-direction.

In fact, in this instance the electric drive unit has to be integrated into a very minor dimensional chain in the z-direction. Owing to the limited dimensional chain in the z-direction, the lubricant sump (also oil sump because oil is often used as a lubricant and/or temperature control medium for the drive machine or the entire drive unit with the output transmission) cannot be disposed below the electric machine—which would enable the oil to flow out—but has to be positioned on the side. Under certain circumstances, the lateral positioning may prevent a reliable suction of oil in the event of lateral acceleration, because the oil remains in the transmission when negotiating a curve in a first curve direction, remains in the electric machine, and does not flow out into the region of the oil suction in the other curve direction. An absence of the oil suction leads to deficient lubrication and/or overheating of drive components.

However, a high level of driving dynamics in the transverse direction has a major priority, in particular for sports-inclined drivers.

Against this background, it is an object of the disclosure to improve a circulation sump device for an electric drive unit of a motor vehicle.

Disclosed according to one aspect is a circulation sump device for an electric drive unit of a motor vehicle, which can be lubricated and/or temperature-controlled via a lubricant, in particular an oil. The circulation sump device has at least:

(a) a lubricant sump, having a first axial region and a second axial region, which can be disposed in a transmission interior of the drive unit or of constituent parts of the drive unit thereof, such as of a drive machine or of an output transmission, (b) a lubricant reservoir which—in terms of an effective direction of gravity and/or a vehicle height direction—below the lubricant sump extends in the first axial region and is connected to the lubricant sump via a lubricant outflow opening, i.e. is in particular disposed between the first axial portion of the lubricant sump and of the lubricant reservoir, and (c) a lubricant sump-to-pump line which is specified to pump lubricant from the second axial region of the lubricant sump into the lubricant reservoir, in particular into where the lubricant reservoir is disposed in the first axial region, in particular via a reservoir pump.

According to one embodiment, a drive axle of the drive machine runs in the vehicle transverse direction in such a way that the first and the second axial region of the lubricant sump are distinguished in particular by their vehicle transverse position.

Reliable conveying of lubricant and/or coolant for the operation of the drive unit is ensured by such a circulation sump device even when curves are negotiated dynamically at high lateral accelerations—in both curve directions. This is all the more important because a high lubricating and/or cooling performance is required in particular for a dynamic driving style.

Additionally, the concept leads to a substantial reduction of the required oil volume in an electric drive unit, in particular in the case of a restricted z-dimension, this meaning advantages in terms of costs and weight.

Disclosed according to a further aspect is an electric drive unit for a motor vehicle, having an electric drive machine in a machine housing, and an output transmission in a transmission housing, wherein the machine housing and the transmission housing can have transmission interiors which are connected to one another, for example by a lubricant overflow, and in which the respective component of the drive unit is received. In this way, lubricant that has accumulated in a transmission lubricant sump can run off, for example, into a lubricant sump of a circulation sump device according to an embodiment of the disclosure, once enough lubricant has accumulated and/or there is inclination of the vehicle suitable for this purpose.

The electric drive unit has a circulation sump device according to one embodiment of the disclosure in order to ensure a reliable supply of lubricant to the drive unit.

According to one embodiment, the lubricant sump of the circulation sump device in the machine housing is formed on both sides of a stator core of the drive machine, and/or a transmission lubricant sump of the transmission housing can empty by way of an overflow into the lubricant sump of the circulation sump device in the machine housing.

In this way, the disclosure can also be applied to a circulation sump device for a combined machine/transmission unit.

According to one embodiment, the lubricant reservoir is disposed below the machine housing, and extends between the conveying outlet and the beginning of the lubricant sump-to-pump line in a transverse direction of the drive unit, in particular in the vehicle transverse direction once installed in a motor vehicle.

The disclosure is based, inter alia, on the idea of recirculating the lubricant by the circulation sump device from a first transverse side of the electric machine to the other transverse side into a lubricant reservoir below the lubricant sump. From there, robust suction is possible in a left hand curve as well as in a righthand curve.

The electric drive machine in the present case according to one embodiment is installed with a rotor rotation axis running in the vehicle transverse direction, so that a first axial portion of the lubricant sump comprises an area on one side of the stator core, and a second axial portion of the lubricant sump comprises an area on the other side of the stator core.

According to one embodiment, a lubricant sump which is disposed divided in two parts on both sides of a stator core is situated in the machine housing. A lubricant reservoir into which the lubricant can run off by gravity is situated below a first axial portion of the lubricant sump. A conveying pump, which is disposed in a conveying line proceeding from the conveying outlet, conveys lubricant from this lubricant reservoir in the direction of the locations requiring cooling and/or lubricating. The second axial portion of the lubricant sump does not contain any (or only contains a very small) reservoir. The lubricant is suctioned from here and recirculated into the lubricant reservoir below the first axial portion of the lubricant sump. A connecting line with a small cross section can be provided and enable the venting of the lubricant sump in the event of a switched-off lubricant pump and balancing of the lubricant filling level.

According to one embodiment, for cost reasons the concept uses a two-stage lubricant pump which can fulfil the function of a reservoir pump as well as the function of a conveying pump. According to one embodiment, only one motor is used herein, with two lubricant conveying installations being attached to the shaft of the motor.

According to one embodiment, a baffle plate prevents air being suctioned into the pressurized stage of the lubricant circuit when negotiating curves, in particular in a dynamic change of direction.

According to one embodiment, the first axial region contains a position of stator end windings on a first side of a stator core of a stator of the drive unit, and the second axial region contains a position of stator end windings on a second side. A particularly large amount of lubricant accumulates at these axial positions in the machine housing—in each case in one curve direction—the lubricant therefore being particularly readily able to be supplied from there for conveyance to the further lubricating and/or cooling operation.

According to one embodiment, a reservoir pump is disposed in the lubricant sump-to-pump line.

According to one embodiment, the lubricant sump-to-pump line in the second axial region is disposed so as to proceed from a stator core-distal axial end of a machine housing of the drive unit and/or of the lubricant sump; in other words, lubricant can pump from there out of the second axial region of the lubricant sump. In this way, sufficient lubricant can be supplied for conveyance by a conveying pump, proceeding from the first axial region, even when lubricant accumulates in the second axial region.

According to one embodiment, the lubricant outflow opening in the first axial region is disposed on a stator core-distal axial end of a machine housing of the drive unit, and/or of the lubricant reservoir, and/or of the lubricant sump. In this way, sufficient lubricant can be supplied for conveyance by a conveying pump, proceeding from the first axial region, when lubricant accumulates in the first axial region.

According to one embodiment, a conveying outlet from the lubricant reservoir, in particular for discharging lubricant from the lubricant reservoir toward a conveying pump which is specified to supply components of the drive unit that are to be lubricated and/or cooled via a conveying line with lubricant, is disposed at or close to an axial position of the lubricant outflow opening. Optimal availability of lubricant at the beginning of the conveying section to the conveying pump can be achieved in this way—as a function of other parameters, such as geometry, lubricant flow rate, etc.

According to one embodiment, the lubricant reservoir also extends in the second axial portion. A larger volume of the lubricant reservoir can be achieved in this way.

According to one embodiment, a baffle, in particular a baffle plate or another flow obstacle, is disposed in the lubricant reservoir, wherein a pressurized oil inlet of the lubricant sump-to-pump line and the conveying outlet from the lubricant reservoir are disposed on the same side of the baffle. In this way, a higher filling level with lubricant can be achieved on one side of the conveying section than on the other side of the baffle in many operating states. This is because all inflows to the lubricant reservoir are disposed on the conveying side and, moreover, a flow obstacle with the baffle is disposed in the direction to that part of the lubricant reservoir that lies on the other side of the baffle.

According to one embodiment, the baffle is specified to impede a flow of lubricant from the first axial region, in particular from the conveying outlet, toward the second axial region.

According to one embodiment, provided between the lubricant reservoir and the second axial region of the lubricant sump, in particular remote from the lubricant sump-to-pump line, is a connecting line which is designed for balancing a lubricant filling level and/or venting the lubricant reservoir.

According to one embodiment, a conveying pump, which is disposed in a conveying line that proceeds from the conveying outlet, and the reservoir pump are designed, in particular as a two-stage lubricant pump, with a common pump drive. Installation space, drive output, and weight can be saved, and robustness can be gained, in this way.

BRIEF DESCRIPTION OF THE DRAWINGS

Further advantages and potential applications of the disclosure are derived from the description hereunder in conjunction with the figures.

DETAILED DESCRIPTION OF THE DRAWINGS

Figure 1:
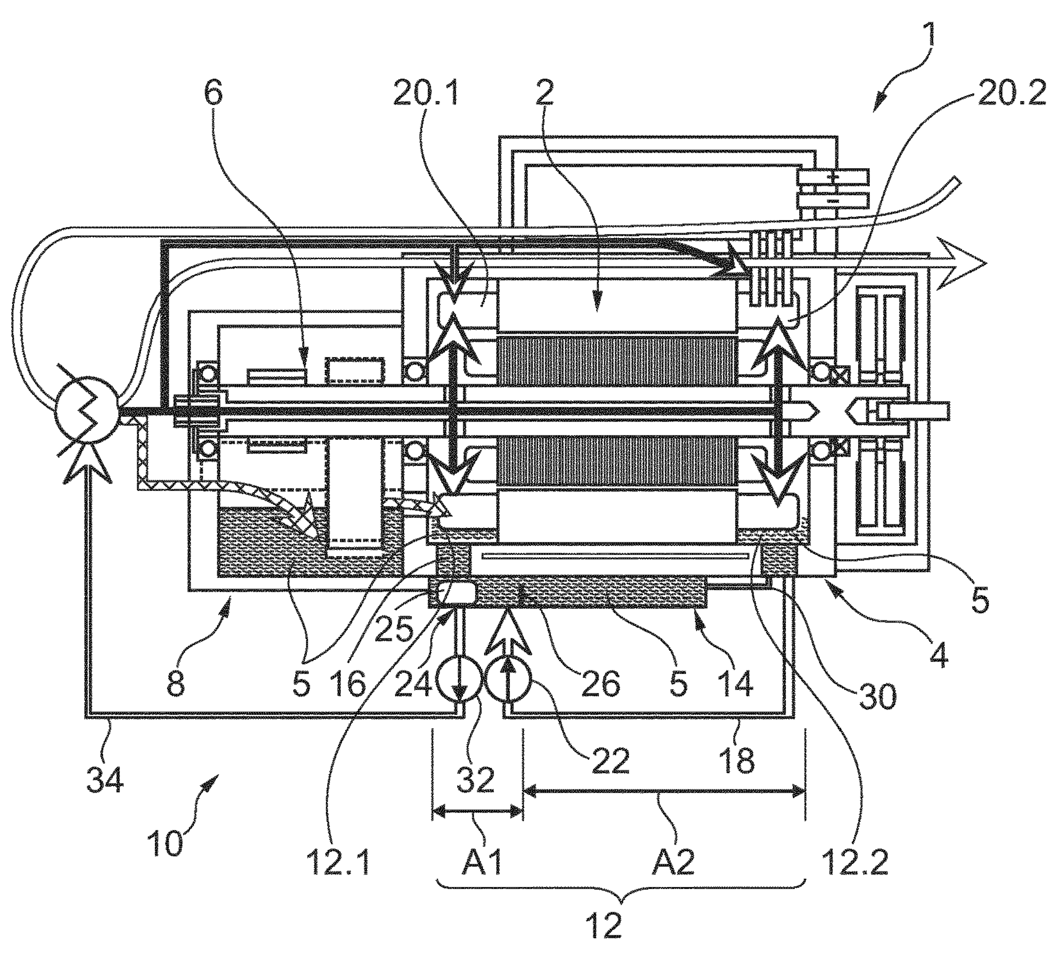
FIG. 1 shows in a schematic view an electric drive unit having a circulation sump device according to an exemplary embodiment of the disclosure without lateral acceleration.

FIG. 1 shows an electric drive unit 1 for a motor vehicle, having an electric drive machine 2 in a machine housing 4, and an output transmission 6 of the drive machine 2 in a transmission housing 8. The electric drive unit can be lubricated and temperature-controlled via of a lubricant S, and for this purpose has a circulation sump device 10.

The circulation sump device 10 has a lubricant sump 12 which is formed in a first axial region A1 (reference sign for that part of the lubricant sump disposed therein: 12.1) and in a second axial region A2 (reference sign for that part of the lubricant sump disposed therein: 12.2).

The lubricant sump 12 of the circulation sump device 10 is formed in the machine housing 4 on both sides of a stator core of the drive machine 2.

A transmission lubricant sump of the transmission housing 8 can empty by way of an overflow into the lubricant sump 12.1 of the circulation sump device 10 in the machine housing 4.

The lubricant reservoir 14 is disposed below the machine housing 4, and extends in a transverse direction of the drive unit 1 between a conveying outlet 24 and the beginning of a lubricant sump-to-pump line 18.

The first axial region A1 contains a position of stator end windings 20.1 on a first side of a stator core. The second axial region A2 contains a position of stator end windings 20.2 on a second side of the drive unit 1.

The circulation sump device 10 moreover has a lubricant reservoir 14 which extends below the lubricant sump 12 in the first axial region A1, and which is connected to the lubricant sump via a lubricant outflow opening 16.

The circulation sump device 10 furthermore has a lubricant sump-to-pump line 18, which proceeds from the second axial region A2 of the lubricant sump 12.2 and is specified to pump lubricant S from the second axial region A2 of the lubricant sump 12.2 into the lubricant reservoir 14. For this purpose, a reservoir pump 22 is disposed in the lubricant sump-to-pump line 18.

The lubricant sump-to-pump line 18 is disposed in the second axial region A2 so as to proceed from a stator core-distal axial end of a machine housing 4, i.e. particularly close to the housing wall thereof (in particular the B-wall) running in a height direction.

The lubricant outflow opening 16 is disposed in the first axial region A1 on a stator core-distal axial end of the machine housing 4, i.e. particularly close to the housing wall thereof (in particular the A-wall which simultaneously serves as a partition wall with a lubricant overflow to the transmission housing 8) running in a height direction.

A conveying outlet 24 from the lubricant reservoir 14 is disposed at an axial position of the lubricant outflow opening 16. The lubricant reservoir 14 also extends in the second axial portion A2.

A baffle 26, which in the exemplary embodiment is designed as a baffle plate, is disposed in the lubricant reservoir 14. A pressurized oil inlet 28 of the lubricant sump-to-pump line 18 and the conveying outlet 24 from the lubricant reservoir 14 are disposed on the same side of the baffle 26—in the illustration here, both to the left thereof.

Figure 2:
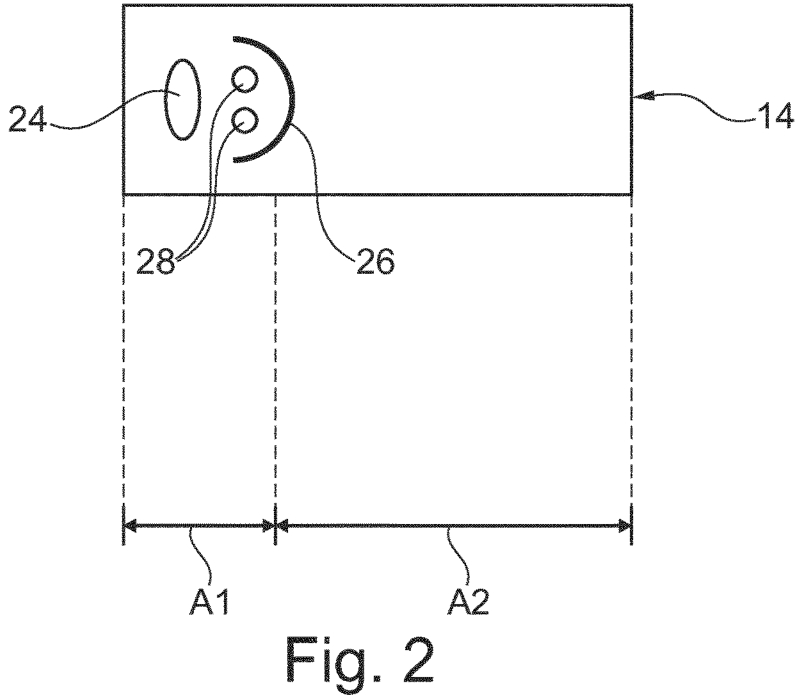
FIG. 2 shows a view from above of a lubricant reservoir of the circulation sump device from FIG. 1.

As can be derived in particular from the detailed illustration of FIG. 2, the baffle 26 is presently embodied so as to be curved about the pressurized oil inlet 28, in order to reinforce the preferred positioning of the lubricant S at the conveying outlet 24. Also as a result, the baffle 26 is specified to impede a flow of lubricant S proceeding from the first axial region A1, particularly from the conveying outlet 24, toward the second axial region A2.

It is ensured in this way that lubricant S, which is to be fundamentally varied in the relevant operating cases, is available at the conveying outlet 24, i.e. the drive unit 1 can always be lubricated and cooled.

The sufficient availability of lubricant S at the conveying plant 24 is readily obtained in an operating state without significant lateral accelerations from the quantity of lubricant S present and from the effect of gravity, so that the lubricant can be continuously conveyed through an outlet filter 25. This operating state is illustrated in FIG. 1.

Figure 3:
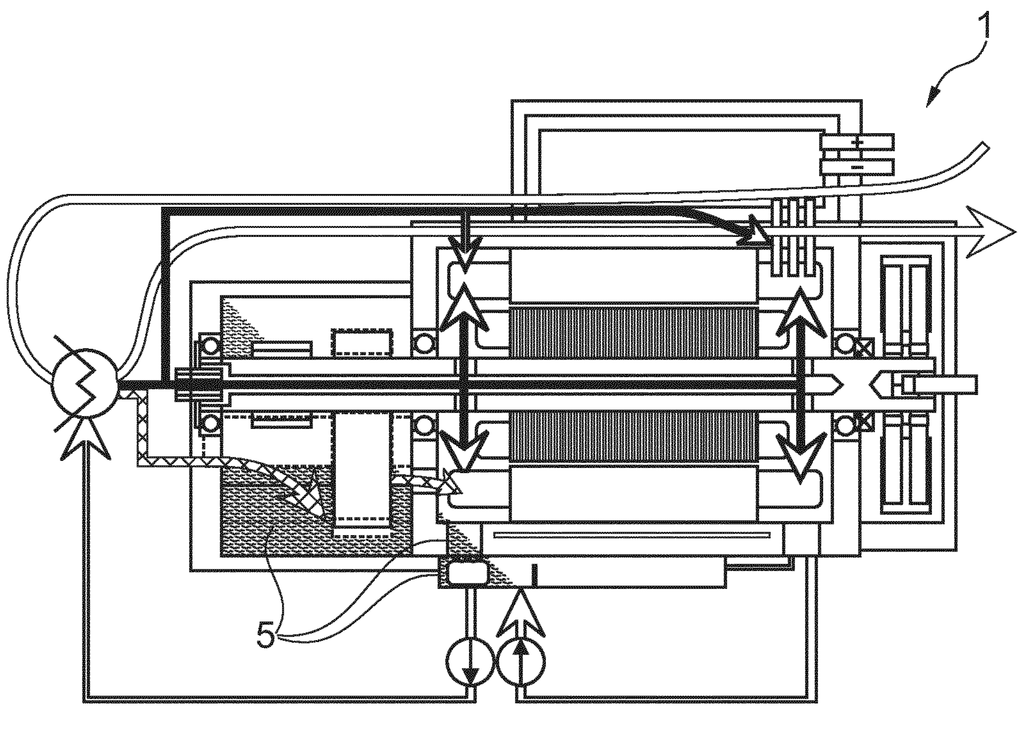
FIG. 3 shows in the view of FIG. 1 a distribution of lubricant at a high lateral acceleration in a first curve direction; and, FIG. 4 shows in the view of FIG. 1 a distribution of lubricant at a high lateral acceleration in a second curve direction, acting counter to the first curve direction.

Illustrated in FIG. 3 is the arrangement of the accumulated lubricant S in a tight righthand curve (i.e. at a significant lateral acceleration in a first curve direction): it can be seen that, by virtue of the arrangement of the conveying outlet 24 on the left hand lateral periphery of the machine housing 4 below the lubricant sump 12.1 in the first axial region A1, there is sufficient lubricant for conveying by the conveying pump 32 available at the conveying outlet 24.

Figure 4:
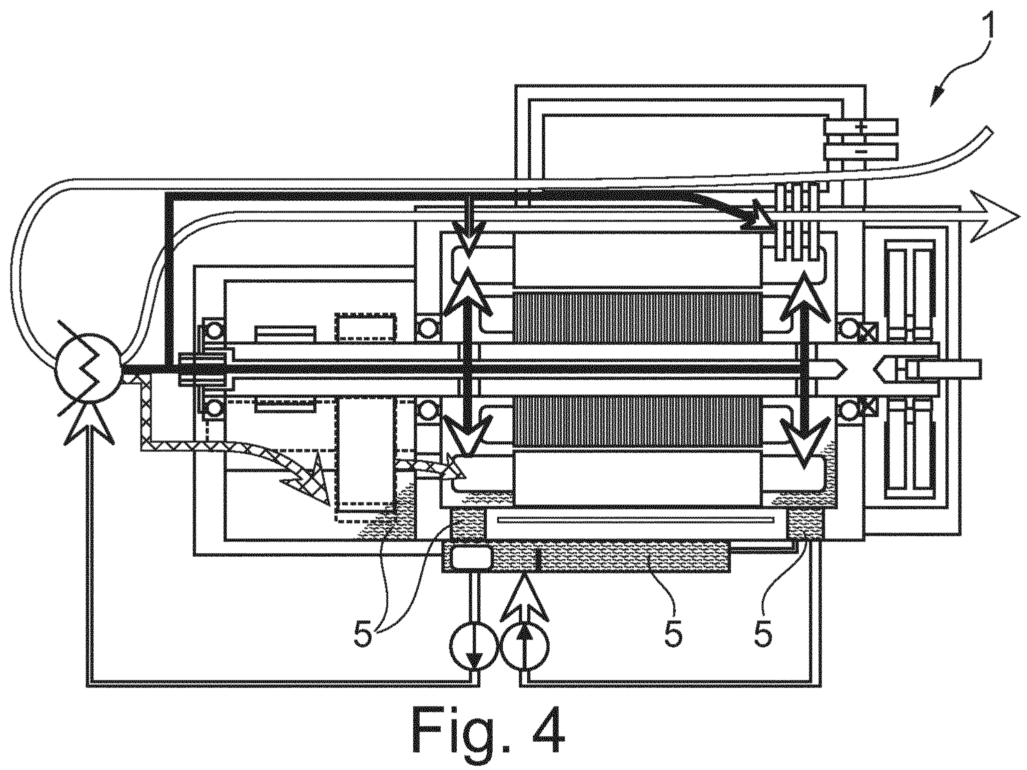

Illustrated in FIG. 4 is the arrangement of the accumulated lubricant S in a tight left hand curve (i.e. at a significant lateral acceleration in a second curve direction): it can be seen that the supply of the conveying outlet 24 with lubricant S is significantly improved by the reservoir pump 22; to the extent that there is fundamentally sufficient lubricant S available at the conveying outlet 24 at any lateral accelerations.

Provided between the lubricant reservoir 14 and the second axial region A2 of the lubricant sump 12.2 is a connecting line 30 which is specified to balance a lubricant filling level and to vent the lubricant reservoir 14.

The conveying pump 32, which is disposed in a conveying line 34 that proceeds from the conveying outlet 24, and the reservoir pump 22 are designed with a common pump drive, presently as a two-stage lubricant pump.

The conveying pump 32 thus reliably supplies the components of the drive unit 1 that are to be lubricated and/or cooled with lubricant S, irrespective of the lateral acceleration of the motor vehicle.

LIST OF REFERENCE SIGNS

Electric drive unit 1
Electric drive machine 2
Machine housing 4
Output transmission 6
Transmission housing 8
Circulation sump device 10
Lubricant sump 12; 12.1, 12.2
Lubricant reservoir 14
Lubricant outflow opening 16
A lubricant sump-to-pump line 18
Stator end windings 20.1, 20.2
Reservoir pump 22
Conveying outlet 24
Outlet filter 25
Baffle 26
Pressurized oil inlet 28
Connecting line 30
Conveying pump 32
Conveying line 34
Lubricant S
First axial region A1
Second axial region A2

What is claimed is:

1. A circulation sump device for an electric drive unit of a motor vehicle, which can be lubricated and/or temperature-controlled via a lubricant, comprising:
- a lubricant sump having a first axial region and a second axial region,
- a lubricant reservoir which extends below the lubricant sump in the first axial region and is connected to the lubricant sump via a lubricant outflow opening, and
- a lubricant sump-to-pump line which is specified to pump lubricant from the second axial region of the lubricant sump into the lubricant reservoir.

2. The circulation sump device according to claim 1, wherein:
- the first axial region contains a position of stator end windings on a first side of a stator core of the drive unit, and the second axial region contains a position of stator end windings on a second side.

3. The circulation sump device according to claim 1, wherein:
- a reservoir pump is disposed in the lubricant sump-to-pump line.

4. The circulation sump device according to claim 1, wherein:
- the lubricant sump-to-pump line is disposed in the second axial region so as to proceed from a stator core-distal axial end of a machine housing and/or of the lubricant sump.

5. The circulation sump device according to claim 1, wherein:

the lubricant outflow opening in the first axial region is disposed on a stator core-distal axial end of a machine housing and/or of the lubricant reservoir and/or of the lubricant sump.

6. The circulation sump device according to claim 1, wherein:

a conveying outlet from the lubricant reservoir is disposed at or close to an axial position of the lubricant outflow opening.

7. The circulation sump device according to claim 1, wherein:

the lubricant reservoir also extends in the second axial portion.

8. The circulation sump device according to claim 1, wherein:

a baffle is disposed in the lubricant reservoir, wherein a pressurized oil inlet of the lubricant sump-to-pump line and the conveying outlet from the lubricant reservoir are disposed on the same side of the baffle.

9. The circulation sump device according to claim 8, wherein:

the baffle is specified to impede a flow of lubricant proceeding from the first axial region to the second axial region.

10. The circulation sump device according to claim 1, wherein:

provided between the lubricant reservoir and the second axial region of the lubricant sump is a connecting line for balancing a lubricant filling level and/or venting the lubricant reservoir.

11. The circulation sump device according to claim 1, wherein:

a conveying pump, which is disposed in a conveying line that proceeds from the conveying outlet, and the reservoir pump are designed with a common pump drive.

12. An electric drive unit for a motor vehicle, comprising:

an electric drive machine in a machine housing, an output transmission in a transmission housing, and a circulation sump device according to claim 1.

13. The electric drive unit according to claim 12, wherein:

the lubricant sump of the circulation sump device is formed in the machine housing on both sides of a stator core of the drive machine.

14. The electric drive unit according to claim 12, wherein:

a transmission lubricant sump of the transmission housing can empty by way of an overflow into the lubricant sump of the circulation sump device in the machine housing.

15. The electric drive unit according to claim 12, wherein:

the lubricant reservoir is disposed below the machine housing and extends between the conveying outlet and the beginning of the lubricant sump-to-pump line in a transverse direction of the drive unit.

16. The circulation sump device according to claim 8, wherein:

the baffle is curved about the pressurized oil inlet.

17. The circulation sump device according to claim 11, wherein:

the conveying pump and the reservoir pump are designed as a two-stage lubricant pump.

18. The circulation sump device according to claim 1, wherein:

the lubricant sump-to-pump line proceeds from the second axial region into where the lubricant reservoir is disposed in the first axial region.

19. The circulation sump device according to claim 10, wherein:

the connecting line is disposed remote from the lubricant sump-to-pump line.

20. The electric drive unit according to claim 12, wherein:

a drive axle of the electric drive machine runs in a vehicle transverse direction such that the first axial region and the second axial region of the lubricant sump are distinguished by their vehicle transverse position.

* * * * *